Figure 1:
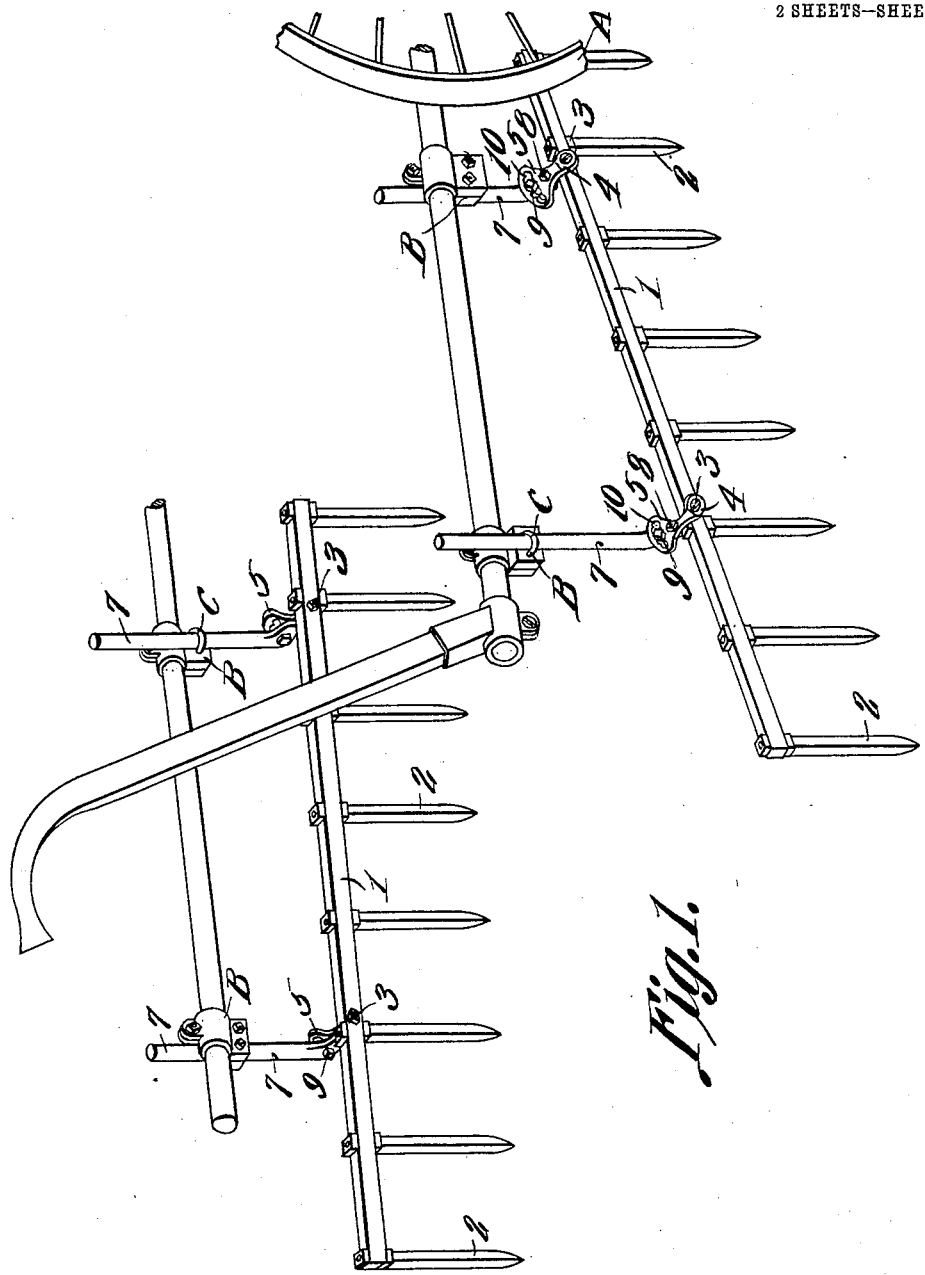

R. S. WYNNE.
HARROW ATTACHMENT FOR CULTIVATORS.
APPLICATION FILED JULY 5, 1911.

1,017,838.

Patented Feb. 20, 1912.

2 SHEETS—SHEET 1.

Witnesses

Robert S. Wynne,
Inventor
by C. A. Snow & Co.
Attorneys

R. S. WYNNE.
HARROW ATTACHMENT FOR CULTIVATORS.
APPLICATION FILED JULY 5, 1911.
1,017,838.
Patented Feb. 20, 1912.
2 SHEETS—SHEET 2.
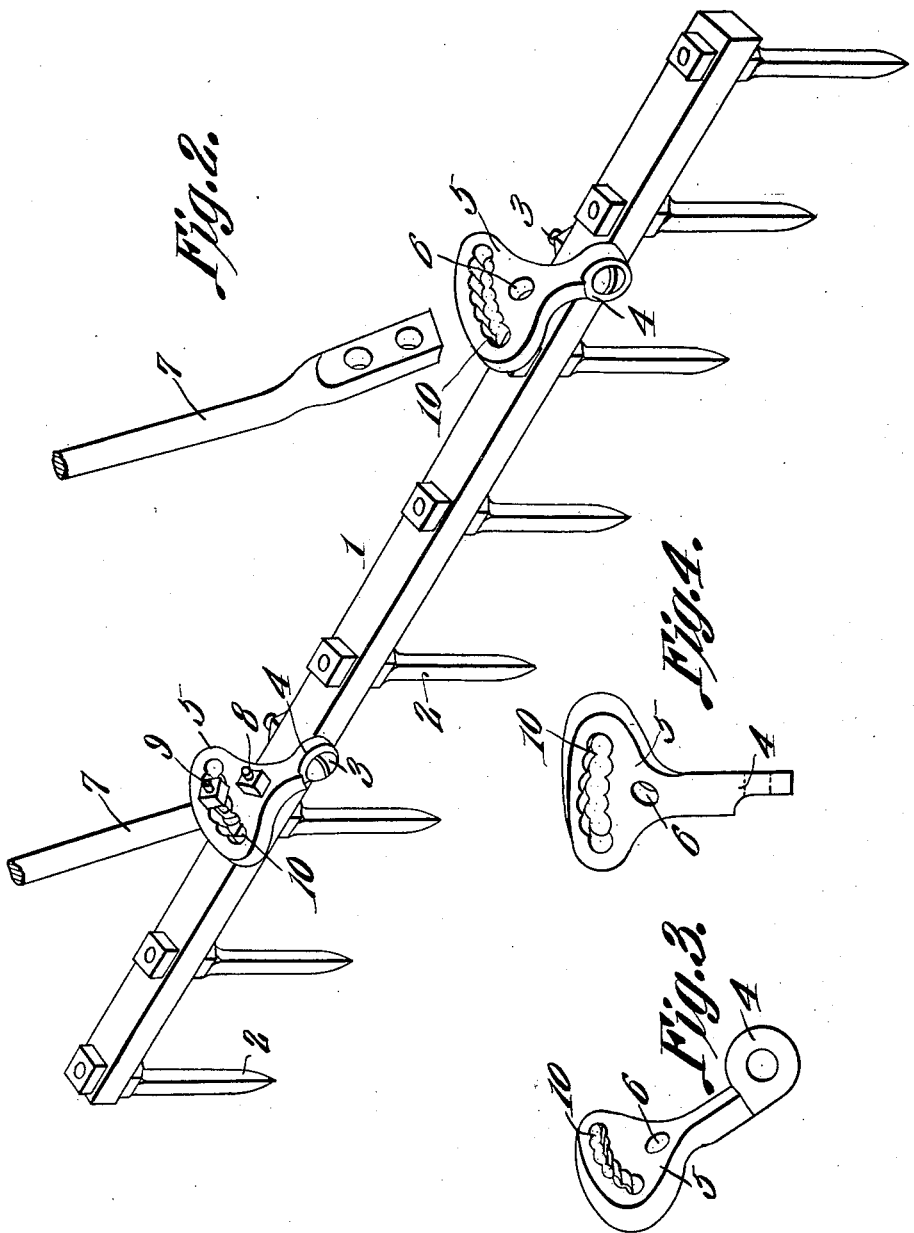
Robert S. Wynne,
Inventor
Witnesses
by C. A. Snow & Co.
Attorneys

UNITED STATES PATENT OFFICE.

ROBERT S. WYNNE, OF WAXAHACHIE, TEXAS.

HARROW ATTACHMENT FOR CULTIVATORS.

1,017,838. Specification of Letters Patent. Patented Feb. 20, 1912.

Application filed July 5, 1911. Serial No. 636,858.

*To all whom it may concern:*

Be it known that I, ROBERT S. WYNNE, a citizen of the United States, residing at Waxahachie, in the county of Ellis and State of Texas, have invented a new and useful Harrow Attachment for Cultivators, of which the following is a specification.

This invention relates to a harrow attachment for cultivators, one of its objects being to provide a harrow member having standards adjustably connected thereto and adapted to be substituted for the standards or foot pieces of the cultivator shovels, the connections between the harrow member and the cultivator being such as to permit the attachment to be held with its teeth disposed in any desired relation to the cultivator.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings the preferred form of the invention has been shown.

In said drawings:—Figure 1 is a detail view of a portion of a cultivator structure and showing the present improvements combined therewith. Fig. 2 is a perspective view of the present attachment, one of the standards being shown disconnected therefrom. Fig. 3 is a side elevation of one of the connecting plates used in connection with a standard. Fig. 4 is a front elevation of one of said plates.

Referring to the figures by characters of reference A designates a portion of a cultivator the frame B of which has the usual or any preferred form of clamping means C for adjustably connecting the standards of the cultivator shovels to the frame.

The attachment constituting the present invention is designed to be substituted for a cultivator shovel and its standard and is to be secured to the frame B of the cultivator by means of the clamps C hereinbefore referred to. Each of the attachments includes a bar 1 having openings extending therethrough to receive harrow teeth 2 which may be held to the bar by any suitable means. Bolts 3 extend transversely through the bar adjacent the center thereof and also adjacent one end, these bolts engaging ears 4 extending from segmental plates 5. These ears are twisted so as to lie in planes intersecting the planes occupied by the plates 5 so that, when the ears are clamped to one side of the bar 1, the plates 5 integral with the ears overhang the bar. Obviously these plates can be swung about the bolts 3 so as to be brought to any desired angle relative to the bar. By tightening the bolts the plates will be held against further adjustment. Each of the plates has a pivot receiving opening 6 and a standard 7 is connected to each plate by means of a connecting bolt 8 extending through the standard and the opening 6. Another bolt 9 is carried by each standard 7 and is insertible into an arcuate slot 10 formed within the adjacent plate 5, the walls of the slot being corrugated so that, when bolt 9 is inserted into certain of the corrugations and tightened, it will securely hold the standards 7 against swinging movement relative to the plates 5.

As heretofore stated the standards 7 of each attachment are adapted to be connected to the frame B of the cultivator by means of the clamps C. These clamps can be adjusted so as to hold the standards 7 at any angles desired and said standards can be adjusted relative to the plates 5 and said plates can be shifted relative to the bar 1 so as to hold said bar and the harrow teeth in any desired position relative to the cultivator frame.

What is claimed is:—

A harrow attachment for cultivators, including a tooth carrying bar, plates connected to, and adjustable angularly relative to the end portions of the bar, each plate having an arcuate slot in the free end portion thereof, the slotted portion of each plate being disposed in a plane intersecting the plane of adjustment of the plate relative to the bar, a standard detachably connected to the slotted portion of each plate and mounted for angular adjustment relative thereto, and means engaging the standard and the walls of the adjacent slot for holding the standard against movement relative to the plate.

In testimony that I claim the foregoing as my own, I have hereto affixed my signature in the presence of two witnesses.

ROBERT S. WYNNE.

Witnesses:
   EDWARD TIDWELL,
   J. C. LUMPKINS.

Copies of this patent may be obtained for five cents each, by addressing the "Commissioner of Patents, Washington, D. C."